April 18, 1939.  C. BANCROFT  2,155,249
ROTARY TORUS CYLINDER MOTOR
Filed July 1, 1937  4 Sheets-Sheet 1

INVENTOR
Charles Bancroft
BY
Kenyon Kenyon
ATTORNEYS

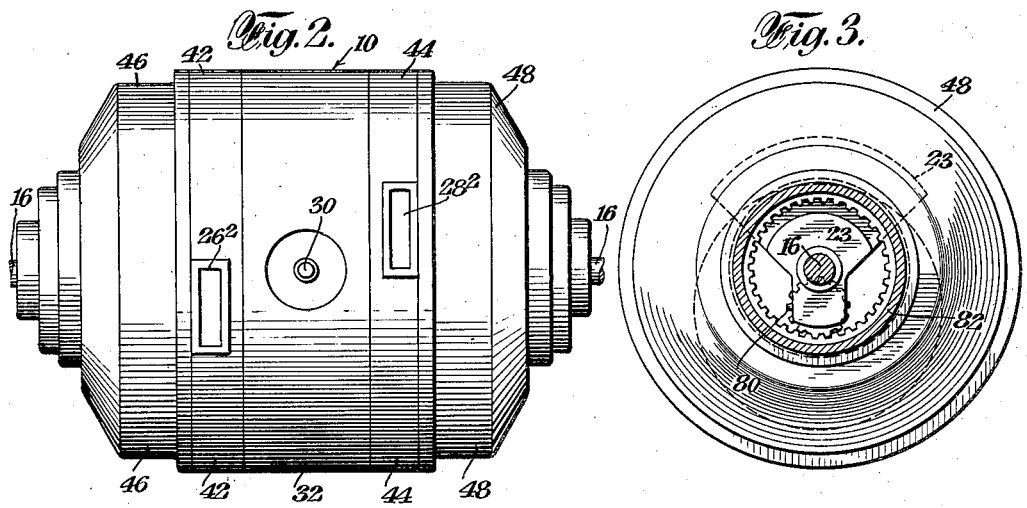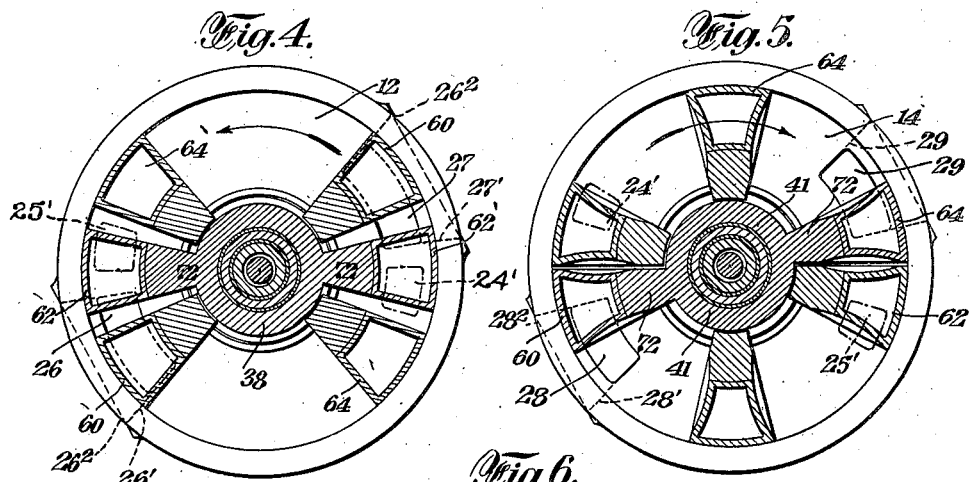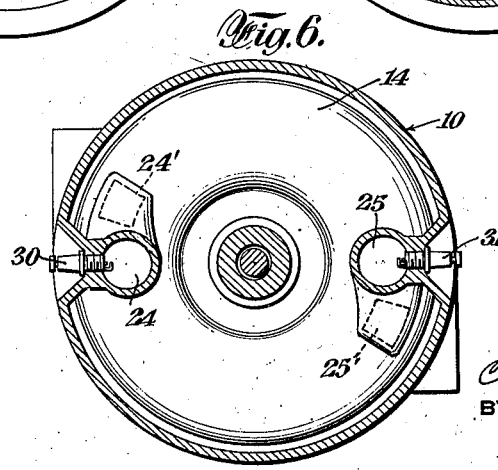

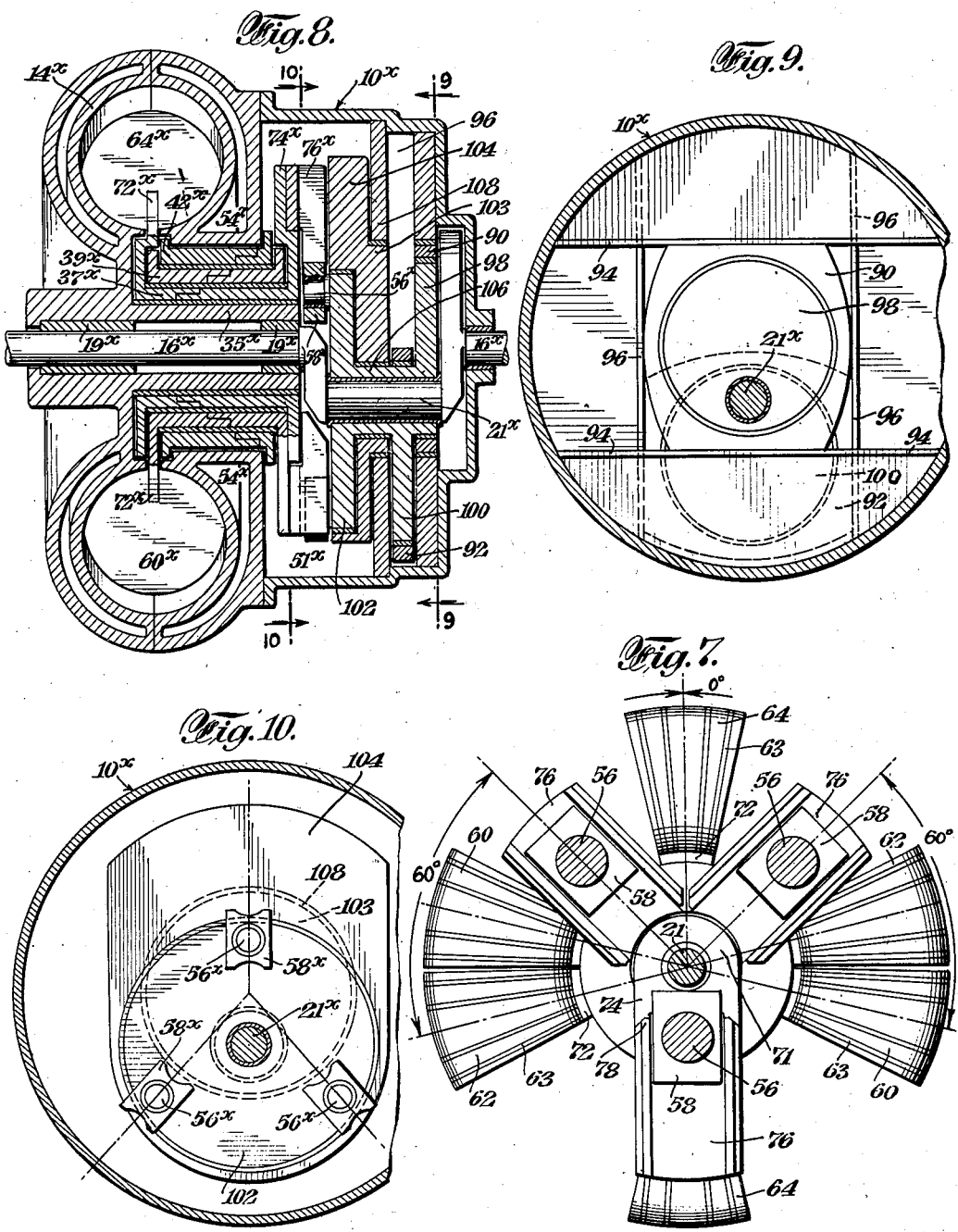

April 18, 1939.   C. BANCROFT   2,155,249
ROTARY TORUS CYLINDER MOTOR
Filed July 1, 1937   4 Sheets-Sheet 4

INVENTOR
Charles Bancroft
BY Kenyon & Kenyon
ATTORNEYS

Patented Apr. 18, 1939

2,155,249

UNITED STATES PATENT OFFICE 2,155,249

ROTARY TORUS CYLINDER MOTOR

Charles Bancroft, New Canaan, Conn.

Application July 1, 1937, Serial No. 151,334

8 Claims. (Cl. 123—11)

This invention relates to improvements in that type of rotary compressors and internal combustion engines sometimes called the alternately accelerating piston type.

Previous engines of this type have had their piston driving mechanism complicated by the necessity of counterbalancing individual piston driving units and weakened by constructional limitations imposed by necessary gearing. In addition large differences in temperature of different sections of the cylinders resulting from only fixed sections of these cylinders being exposed to the flames of combustion have caused serious warpage of these cylinders and made the efficient operation of piston sealing means such as rings practically impossible.

In my invention, a special relationship between the individual sets of pistons and their driving means make possible the use of three pairs of pistons per cylinder instead of the two pairs per cylinder used in previous engines of this type and with this extra pair of pistons per cylinder, the crank arms of the pistons of each cylinder balance each other without the use of special counterbalances. This simplifies the assembly of two units or cylinders in one motor and makes special positioning of the working parts of such a motor for the purposes of balancing unnecessary. The extra pair of pistons in each cylinder also assists in preventing leakage between strokes and in equalizing temperature differences in different parts of the cylinders as well as materially increasing the displacement ability of given cylinders.

More specifically, my invention comprises the assembly of two working units or cylinders in a motor each cylinder being provided with three pairs of pistons and means for driving and controlling the rotation of these pistons and common means for maintaining a fixed relationship between the pistons of each cylinder. In this motor, one of the cylinders is provided with intake passages and the other with exhaust passages and both cylinders have common connecting passages between them which also serve as combustion chambers and are equipped with spark plugs. The unit equipped with intake passages serves solely as a compressor while that equipped with exhaust passages serves as a motor so that my invention refers to both compressors and motors.

In one form of my invention I employ geared means of driving and maintaining a fixed relationship between the various moving parts of such an engine and in another form of my invention I may use an eccentric means of driving and maintaining a fixed relationship between the various moving parts of such an engine without the use of gears.

In my apparatus, each set of pistons is mounted in a cylinder of a stator on a separate sleeve, the sleeves being telescopically or rather concentrically arranged and having co-planar flanges or flange portions for attachment to the pistons. The sleeves are provided with slotted crank arms which have a novel, special, angular relationship with respect to the pistons on the respective sleeves, as will hereinafter be described, for cooperation with control members mounted on crankpins of a crankshaft in the stator for controlling the relative position of the sets of pistons. These control members are provided with bearing blocks adapted to engage the slotted crank arms for diving and controlling the rotation of the pistons. The said control members are adapted to be rotated by gearing or, as in the modified form of my invention, by suitable eccentric bearings in connection with associated parts in the stator which cooperate to drive said control or connecting members in a direction opposite to that of the crankshaft.

In the drawings:

Fig. 2 represents a partial external longitudinal view showing one of the two intakes and one of the two exhausts; also the positioning of one of the spark plugs;

Fig. 3 represents a reduced vertical transverse cross section taken on line 3—3 of Fig. 1 showing part of the piston driving means of one section;

Fig. 4 represents a reduced vertical transverse cross section taken on line 4—4 of Fig. 1 showing the cylinder and pistons of one section;

Fig. 5 represents a reduced vertical transverse cross section taken on line 5—5 of Fig. 1 showing the pistons in the other cylinder;

Fig. 6 represents a reduced vertical transverse cross section taken on line 6—6 of Fig. 1 showing the combination combustion chambers and passages connecting the two cylinders and the spark plugs;

Fig. 7 represents a portion of the device showing the pistons of one section and the hollow sleeves and slotted crankarms associated with these pistons and the bearing blocks associated with these crankarms;

Fig. 8 represents a longitudinal cross section of one unit of another form of my device in which the gears are replaced by other means of driving the connecting or control member and in which another means of counterbalancing the crankshaft is shown;

Fig. 9 represents a vertical transverse cross section taken on line 9—9 of Fig. 8 showing the eccentric bearings provided on the connecting member and the parts slidably mounted in the stator which cooperate to give rotation to said connecting member in a direction opposite to that of the crankshaft;

Fig. 10 represents a vertical transverse cross section taken on line 10—10 of Fig. 8 showing the counterbalance rotatably mounted on the connecting member and its bearing concentric with the crankshaft in the stator through which it is driven.

Figure 1:
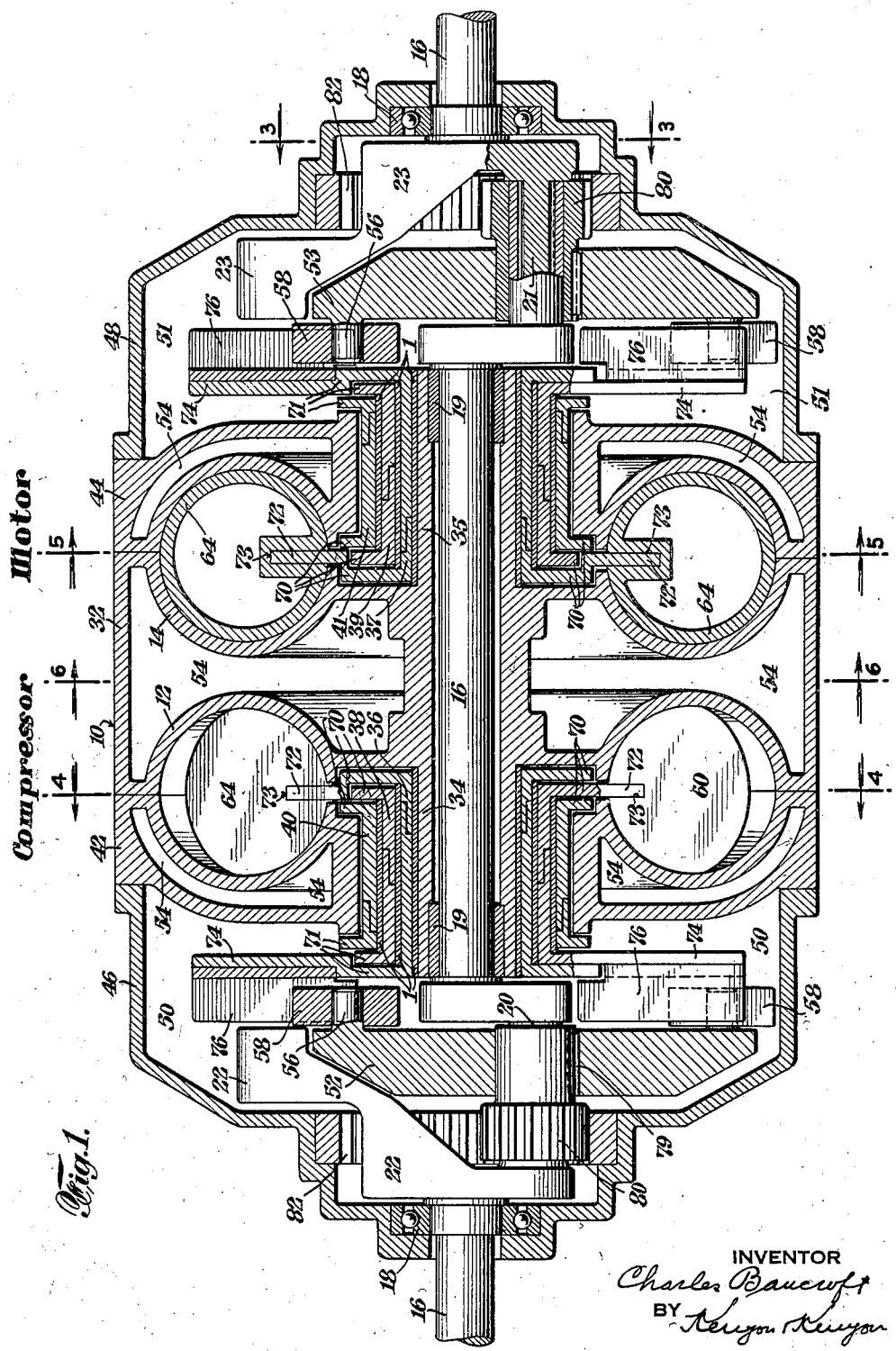
Fig. 1 represents an enlarged longitudinal cross section of my device.
Figure 11:
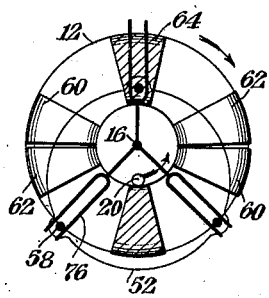
Figs. 11 to 23 represent diagrammatic views showing the positions of the pistons in one unit during the operation of the device.
Figure 12:
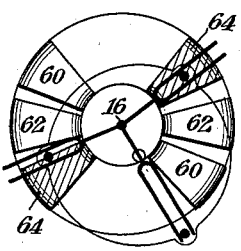
Figure 13:
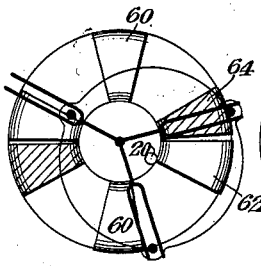
Figure 14:
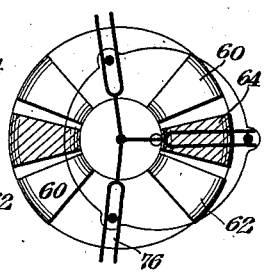

Referring now to the drawings, the reference character 10 designates a stator provided with working chambers or units 12 and 14 in the form of torus cylinders. A crank shaft 16 is rotatably mounted between bearings 18 located at opposite ends of the stator 10 and has crank throws or crankpins 20 and 21 located adjacent opposite ends of the stator, there being one crank throw for each one of said working units. The respective crank throws or crankpins 20 and 21 may be provided with counterbalance weights 22 and 23 (Figs. 1 and 3). As shown in Fig. 6, two combination connecting passages and combustion chambers 24 and 25 are provided between the units 12 and 14, which have ports 24' and 25' communicating with the unit 14 and similar ports (not shown) communicating with the unit 12. As shown in Figs. 2 and 4, unit 12 is provided with two inlet ports 26 and 27 connected respectively by passageways 26' and 27' to intake openings 26² in the stator 10 and to a second intake opening (not shown) diametrically opposite the intake 26² in the said stator. The other unit 14 (Figs. 2 and 5) is provided with two exhaust ports or outlets 28 and 29 connected respectively by passageways 28' and 29' with the exhaust opening 28² in stator 10 and a second exhaust opening (not shown) diametrically opposite exhaust opening 28² of the said stator. In the embodiment shown the angular measure of the inlet or intake ports 26, 27 of the unit 12 and the exhaust ports 28, 29 of the motor unit 14 is approximately 30 crank angle degrees. The angular measure of the ports 24' and 25' of the unit 14 is approximately 15 crank angle degrees and the similar ports (not shown) leading from the unit 12 to the combustion chambers 24 and 25 respectively measure about 10 crank angle degrees. These figures, however, are cited by way of example only and it is understood that variations may be made depending upon the angular measure of the pistons as well as on other conditions as is well understood by those skilled in the art. The relative angular positions of the respective ports of the two cylinders, too, is a matter of arrangement well understood by those skilled in the art. The units 12 and 14 which are interconnected by the firing passageways or chambers 24 and 25 have spark plugs 30 and 31 respectively located in the said chambers. The stator 10 comprises a plurality of parts to facilitate the assembly and the parts may be bolted or otherwise secured together. The parts of the stator (see Figs. 1 and 2) are the middle section 32, the intermediate sections 42 and 44, and the two outer sections 46 and 48.

Mounted in central oppositely extending tubular extensions 34 and 35 of the stator are the bearings 19 which together with the bearings 18 in the two outer parts 46 and 48 serve to support the crank shaft 16. Also mounted in the said two outer sections 46 and 48 are the fixed internal gears 82 for a purpose later to be described. The intermediate sections 42 and 44 cooperate with the respective outer sections 46 and 48 to form chambers 50 and 51 which receive the respective connecting or control members 52 and 53. The middle section 32 cooperates with the two intermediate sections 42 and 44 to form the torus chambers or cylinders 12 and 14. The middle and intermediate sections 32, 42 and 44 are provided with a water jacket 54 which surrounds the cylinders 12 and 14.

Rotatably mounted in each of the working units 12 and 14 are three sets or pairs of pistons 60, 62 and 64 (see Figs. 1, 4, 5, 7). These pistons are each formed as sections of a torus and are provided with sealing rings 63 (Fig. 7). In each unit each set of pistons, two in number, is rigidly mounted on a sleeve, similarly, for example, as shown in my earlier United States Patent No. 2,061,131, the inner sleeves 36 and 37, the middle sleeves 38 and 39 and the outer sleeves 40 and 41 for that purpose, being shown in section in Fig. 1. These sleeves are of different sizes so as to be concentrically or telescopically arranged and, for purposes of assembly, are each made of two parts keyed or otherwise secured together. Bearings 1, respectively, are provided between central oppositely-extending tubular extensions 34 and 35 of the stator and the inner sleeves 36 and 37 and between the said inner sleeves and the said middle sleeves 38 and 39 and between the said middle sleeves and outer sleeves 40 and 41. The inner ends of the sleeves of each unit are provided with flanges 70 and the outer ends of the sleeves are provided with the flanges 71 (Fig. 1). Each inner flange has two cut away flange portions 72 at diametrically opposite points and each outer flange has a single cut away flange portion 74. All the cut away flange portions 72 and 74 respectively at each end of the sleeves of each unit are co-planar and shaped so as to allow a certain amount of independent rotary motion of the sleeves (see Figs. 4, 5, 7). The pistons 60, 62 and 64 are each provided with a slot 73 (Fig. 1) in which cut away flange portions 72 on the inner ends of the respective sleeves are adapted to fit for mounting purposes. Thus the pistons 62 of unit 12, for example (Fig. 4) are attached to the cut away flange portions 72 of the middle sleeve 38 and the pistons 64 of the unit 14 (Fig. 5), for example, are attached to the cut away flange portions 72 of the inner sleeve 37. To each of the single outer cut away flange portions 74 of each sleeve is attached a slotted crank arm 76 (Figs. 1 and 7). A special angular relationship, as shown in Fig. 7, exists between the pistons 60, 62 and 64 and their respective slotted crank arms. In each working unit 12 and 14, the three pairs of pistons must be so positioned with respect to their respective crank arms on their respective sleeves that the angular relationships of two of the pairs of pistons with their respective crank arms must vary by 60 degrees from that of the third pair of pistons with its respective crank arm and in opposite directions. Thus, for example, if as shown in Fig. 7, the lower crank arm 76 is in line with its pistons 64, the right hand crank arm 76 for the pistons 60 is 60 degrees out of line with the said pistons 60 in one direction, and the left hand crank arm 76 for the pistons 62 is 60 degrees out of line in the opposite direction with the said pistons 62.

It, however, is not necessary that any crank arm be in line with its pistons so long as the special angular relationship prescribed between the crank arms and their respective pistons is maintained. For example, if the lower crank arm 76 were 10 degrees out of line with its pistons the other crank arms would be 70 and 50 degrees respectively out of line with their respective pistons and in opposite directions. This angular relationship constitutes an important part of my invention.

The outer ends of the sleeves of each unit with their flanges 71, cut away flange portions 74 and slotted crank arms 76 project into chambers 50 and 51 at opposite ends of the stator respectively in which are located connecting or control members 52 and 53 rotatably mounted respectively on crankpins 20 and 21 of crank shaft 16. These control or connecting members each consist of a disc or its equivalent on which are positioned three projecting hubs or bearings 56 equally spaced from the center of rotation of these members on their respective crankpins and equidistant from each other. Rotatably mounted on these bearings are bearing blocks 58 which are received by the slotted crank arms 76 of the two units and cooperate with them to control the motion of the pistons. Each of these control members 52 and 53 has, as an integral part, or keyed thereto as at 79, a gear 80 which meshes with one of the stationary internal gears 82 mounted in the two outer sections of the stator 46 and 48 coaxially with the crank shaft 16, the pitch diameter of the spur gear 80 being one-half the pitch diameter of the ring gear 82.

In Figs. 8, 9 and 10, I have shown a single working unit 14$^x$ of my invention which has been modified by replacing the gears 80 and 82 used in controlling the rotation of the connecting member by eccentric driving means. This means includes blocks 90 and 92 slidably mounted in bearings or guides 94 and 96 in the stator. Block 90 is adapted to move horizontally only in the bearings or guides 94, and block 92 is adapted to move vertically only in the stator bearing or guides 96. The blocks 90 and 92 are rotatably mounted on eccentric bearings 98 and 100, respectively, which are provided as part of the connecting or control member 102 which corresponds to the connecting members 52 and 53 of the first described modification. This member 102 has the projecting hubs 56$^x$ equally spaced from the center of the rotation of the member 102 on its crank pin 21$^x$. Rotatably mounted on these hubs 56$^x$ are bearing blocks 58$^x$ which are received by the slotted crank arms 76$^x$ and co-operate with them to control the motion of the pistons, there being three pairs of pistons rotatable in unit 14$^x$ as in the units 12 or 14 of the first modification. The eccentric bearings 98 and 100 have an eccentricity with respect to the center of rotation of the connecting member 102 on the crankpin 21$^x$ equal to the distance between the axis of the crank shaft 16$^x$ and the axis of the crankpin 21$^x$. A further difference between the unit shown in these figures and the apparatus previously described is in the provision of counterbalance 104 which is rotatably mounted on bearing surface 106 provided on connecting member 102. This counterweight has an annular shoulder or bearing 103 which is concentric with the crank shaft 16$^x$ and eccentric to the crank pin 21$^x$ and which fits in an opening in a bearing 108 on the stator 10$^x$, which opening also is concentric with respect to the crankshaft 16$^x$. Thus the said counterbalance is driven when the said crankshaft 16$^x$ is rotated. Likewise when the crank shaft is rotated, the connecting member 102 is rotated in opposite direction thereto through the said eccentric bearings 98 and 100 and the blocks 90 and 92. With the exceptions in the structure herein noted and various other minor changes in construction, this unit 14$^x$ is similar to those in the motor previously described and reference numerals with the superscript "x" denote parts corresponding to those in the earlier described modification. It is, of course, understood that suitable inlet ports and outlet ports (not shown) similar to those of the first modification for the fluids or fuel charges are provided for units driven by the eccentrics instead of gearing. One of these units alone may be used as a compressor or two of these units in combination exactly as that of the first modification may be used, one as a compressor unit and the other as a motor unit. Further description, therefore, is not believed necessary.

In Figs. 11 to 23, I have included diagrammatic views showing the positions of the pistons in one unit during one rotation of the crankshaft. The pistons in the other unit have the same cycle of rotation but the phase relationship of these cycles is arranged so that the moments of minimum distance between adjoining faces of the pistons of one unit will occur alternately with those of the other unit. This phase relationship is illustrated in Figs. 4 and 5 of the drawings, which show the relative positioning of the pistons of the two units at a given moment and may be accomplished by having an angular relationship between the two crank throws of the crank shaft equal to 30 degrees, or 30 degrees plus 60 degrees, or 30 degrees plus a multiple of 60 degrees. The relative positions of the pistons of the two units are maintained by the control members 52 and 53 and by the relative angular displacement of the crankpins 20 and 21 with respect to each other. In these figures, the positions of the pistons are shown at positions corresponding to 30 degree interval movements of the crankshaft. Figs. 11, 13, 15, 17, 19, 21 and 23 represent views similar to that shown in Figs. 5 and 7 of the drawings but with different pistons in the relative positions. Figs. 12, 14, 16, 18, 20 and 22 represent views similar to that shown in Fig. 4 of the drawings but also with different pistons in the relative positions. These figures will be referred to in the following operation of the device.

Figure 15:
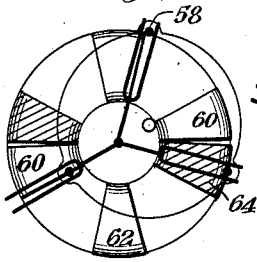
Figure 16:
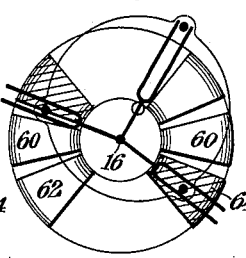
Figure 17:
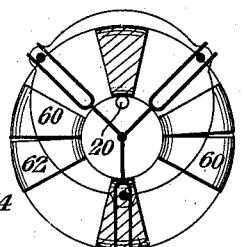
Figure 18:
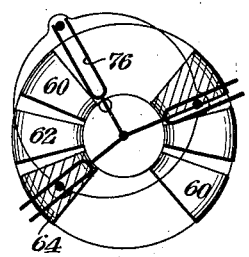
Figure 19:
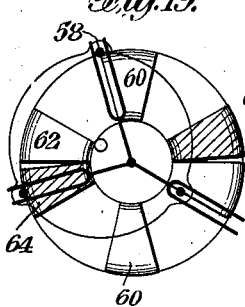
Figure 20:
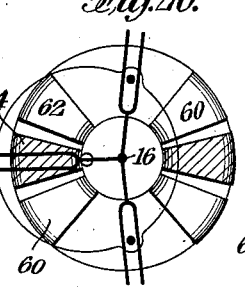
Figure 21:
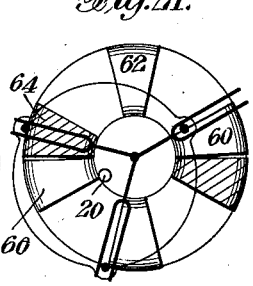
Figure 22:
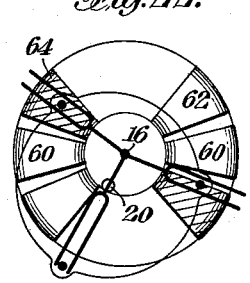
Figure 23:
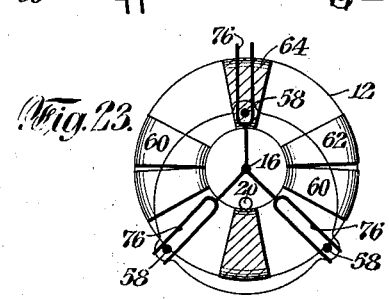

The operation of the engine comprising a compressor unit and a motor or working unit will now be given. The shaft 16 is started in one direction causing rotation of the connecting members 52 and 53 and pistons 60, 62 and 64 of each unit in the other direction, and a fuel mixture is drawn into the compressor cylinder 12 through inlet ports 26 and 27 by the relative rotation of the pistons in the said cylinder. With the pistons in the position shown in Fig. 4 or Fig. 12 and the shaft beginning its rotation, pistons 60 will travel away from pistons 62 and 64 at a faster rate than they are travelling so as to form induction strokes and the pistons assume the positions shown in Figs. 13 and 14 successively. Further rotation of the shaft causes pistons 62 to travel at a faster rate than pistons 64 and 60 compressing the charges drawn in between pistons 60 and 62 as shown in Figs. 15 and 16. At this point, the compressed charges come into conjunction with ports of the combined connecting passages and firing chambers 24 and 25 and, as the crankshaft rotates further, pistons 60 and 62 of the compressor unit draw still closer together as shown in Fig. 17 forcing the gas into the combustion chambers 24 and 25 and between corresponding pistons 60 and 62 of the motor unit 14 which, being phased as previously described, are now beginning to draw apart from their closest position. During this period of transfer of the combustion charges from the compressor 12 to the motor 14 and while the compressor pistons are drawing together and the motor pistons drawing apart, a substantially constant volume of the compressed charges is maintained, since the reduction in space between the pistons in the compressor unit 12 is offset by the increasing space between the corresponding pistons of the motor unit 14. The combustion charges are ignited by spark plugs 30 and 31 during this period of substantially constant compression and, being transferred to the motor unit, the resulting expansion of the fluids forces the pistons of the motor unit apart, thereby driving the motor. The burnt charges are then expelled through the exhaust ports 28 and 29 when the pistons once more draw together. This process proceeds successively between adjoining faces of the pistons in the motor as they pass by their respective ports resulting in six charges being drawn in, compressed, fired and expelled by each half of the motor units per revolution and giving six double overlapping firing strokes per revolution. The variation in the movements of the pistons is obtained by the connecting members 52 and 53 and the gearing 80 and 82. More particularly, as the crankshaft 16 rotates, crankpins 20 and 21 are rotated and as the gears 80 are freely mounted on the crankpin and mesh with stationary gearing 82, the gears 80 will rotate in the opposite direction and will cause opposite rotation of the control members 52 and 53 and with them the piston driving crank arms 76. The gears give the control or connecting members 52, 53 one revolution with respect to the stator in one direction for every revolution of the crankshaft in the other direction. By reason of the 1 to 2 ratio of gears 80 to gears 82, the pistons will always be together at, and only at, predetermined points. As the pistons are connected through telescoping sleeves 36 and 37, 38 and 39, and 40 and 41 with their slotted crank arms, in which the bearing blocks 58 of the connecting members 52 and 53 slide, they will be rotated at varying speeds to give the required movements indicated. The movements of the pistons in each unit are the same for each cycle, so that each piston takes up the position and movement of its preceding piston.

By means of the connecting member 52 and 53 and associated parts, the pairs of pistons in each unit are rotated a certain amount independently of each other as well as a group and the varying speeds of individual pairs of pistons causes them to alternately drop back from or catch up with the other pairs of pistons in the group, forming in this way working chambers whereby rotation of the crankshaft 16 is brought about.

In the operation of the modified form of my invention, the use of the eccentric bearings 98 and 100 on the connecting member 102 and the sliding blocks 90 and 92 in the respective bearings 94 and 96 of the stator serve to give the connecting member 102 opposite and equal speeds of rotation to that of the crankshaft with respect to the stator and the use of the counterbalance 104 pivoted on the connecting member and driven through the bearing 108 connected with the stator, serves to give the pistons a smooth and substantially the same cyclic operation as given above with respect to the first-named modification. In fact, the only substantial difference between this modification and that of the first is the substitution of the eccentric drive of the connecting member 100 for the gearing drive for the connecting members 52 and 53 of the first described modification. It is not believed necessary, therefore, to give a detailed description of the operation of this second modification.

From the foregoing, it will be seen that I have set forth a new construction employing three pairs of pistons per cylinder to provide a substantially completely balanced more easily sealed displacement device and allowing the practical assembly of two such units in a motor with one unit acting solely as a compressor and the other solely as a motor, and have provided efficient means of transferring the charges when compressed from the compressor to the motor, thereby decreasing the objectionable temperature differences between different parts of the same cylinders. In addition, my device allows complete scavenging and high volumetric efficiency regardless of the compression ratio used.

What I claim is:

1. An apparatus of the character described, including in combination a stator, a shaft rotatably mounted therein and formed with a crank pin, a working chamber in said stator, three pairs of pistons rotatably mounted in said chamber, telescoping sleeves, each provided with two flange portions at one end thereof for connecting a pair of said pistons to each sleeve, all the said flange portions being co-planar and co-planar flange portions at the other ends of said sleeves, a crank arm connected to each of said second named co-planar flange portions, there being one crank arm for each pair of pistons, a connecting member mounted on said crank pin and having means to engage slidably said crank arms for controlling the relative position of said piston during the operation of the apparatus, and geared means for rotating said connecting member in opposite direction to said shaft, the relationship between said crank arms and their respective pairs of pistons being such that the angular relationship of two pairs of pistons with their respective crank arms each vary by sixty degrees from that of the third pair of pistons with its respective crank arm and in opposite directions.

2. An apparatus of the character described, including in combination, a stator, a shaft having a crank pin and rotatably mounted in said stator, a working chamber in said stator, three pairs of pistons rotatably mounted in said chamber and means for controlling the rotation of said pairs of pistons so as to cause alternate acceleration and deceleration of said pistons during the rotation thereof in said chamber, said means including a controlling member mounted on said crank pin, crank arms attached to said pairs of cylinders, means on said controlling member for engaging said crank arms, and geared means for driving said controlling member in opposite direction to said shaft.

3. An apparatus of the character described, including in combination, a stator, a shaft having a crank pin and rotatably mounted in said stator, a working chamber in said stator, three pairs of pistons rotatably mounted in said chamber and means for controlling the rotation of said pairs of pistons so as to cause alternate acceleration and deceleration of said pistons during the rotation thereof in said chamber, said means including a controlling member mounted on said crank pin, crank arms attached to said pairs of pistons, means on said controlling member for engaging said crank arms, and means for driving said controlling member in opposite direction to said shaft.

4. An apparatus of the character described, including in combination, a stator, a shaft having a crankthrow and rotatably mounted in said stator, a working chamber in said stator, three pairs of pistons rotatably mounted in said chamber, and means for controlling the rotation of said pairs of pistons so as to cause alternate acceleration and deceleration of said pistons during the rotation thereof in said chamber, said means including a controlling member mounted on said crankthrow, a crank arm connected to each of said pairs of pistons, means on said controlling member for engaging said crank arms and means for driving said controlling member in opposite direction to said shaft, the relationship between said pairs of pistons and their respective crank arms being such that the angular relationship of two of the pairs of pistons with their respective crank arms each vary by sixty degrees from that of the third pair of pistons with its respective crank arm and in opposite directions.

5. A motor of the character described, including in combination, a stator, a shaft having a crank pin and rotatably mounted in said stator, said stator including an internal tubular extension surrounding a portion of said shaft, three sets of pistons having a common axis of rotation in said stator, a member to control the rotation of said pistons and mounted on said crankpin, telescoping sleeves for connecting said members with said sets of pistons, there being one sleeve for each set of pistons, said sleeves being rotatably mounted on said tubular extension, said stator being provided with gearing, and said member having a driving gear meshing with said gearing on said stator for controlling the positions of said pistons during the operation of the device.

6. An apparatus of the character described including in combination a stator, a crank shaft rotatably mounted in said stator, a working chamber in said stator, a plurality of pairs of pistons rotatably mounted in said chamber, and means for controlling the rotation of said pairs of pistons so as to cause alternate acceleration and deceleration of said pistons during the rotation thereof in said chamber, said means including a controlling member rotatably mounted on the crank pin of said crank shaft, a crank arm attached to each pair of pistons, means on said controlling member for engaging said crank arms, eccentric means for driving said controlling member in opposite direction to said crank shaft, a counterweight rotatably mounted on said controlling member eccentric to said crank pin, a fixed bearing in said stator whose center is coaxial with said crank shaft and in which is journalled said eccentric means for driving said controlling member whereby said counterweight is driven when said shaft is rotated.

7. Apparatus of the character described including in combination a stator comprising a crank shaft rotatably mounted in said stator and having a crank pin, a plurality of disks rotatably mounted on said crank pin eccentrically thereof and oriented relative to each other, bearings in which said disks are journalled, means confining said bearings to linear reciprocating motion, rotatable members coaxial with said crank shaft, radial guide means on each rotatable member, a control member rotatably mounted on said crank pin and attached to said disks, blocks carried by said control member for slidable engagement with each of said radial guide means, a counterweight rotatably mounted on said control member eccentric to said crank pin, a fixed bearing in said stator whose center is coaxial with said crank shaft and a bearing on said counterweight journalled in said fixed bearing whereby said counterweight is driven when said shaft is rotated.

8. Apparatus of the character described including in combination a stator, a crank shaft rotatably mounted in said stator and having a crank pin, a working chamber in said stator, a plurality of pairs of pistons rotatably mounted in said chamber, and means for controlling the rotation of said pairs of pistons so as to cause alternate acceleration and deceleration of said pistons during rotation thereof in said chamber, said means including a plurality of disks rotatably mounted on said crank pin eccentrically thereof and oriented relative to each other, bearings in which said disks are journalled, means confining said bearings to linear reciprocating motion, radial guide means associated with each pair of pistons, a control member rotatably mounted on said crank pin and attached to said disks, blocks supported by said control member for sliding engagement with each radial guide means, a counterweight rotatably mounted on said control member eccentric to said crank pin, a fixed bearing member in said stator whose center is coaxial with said crank shaft and a bearing on said counterweight journalled in said fixed bearing whereby said counterweight is driven when said shaft is rotated.

CHARLES BANCROFT.